Figure 1:
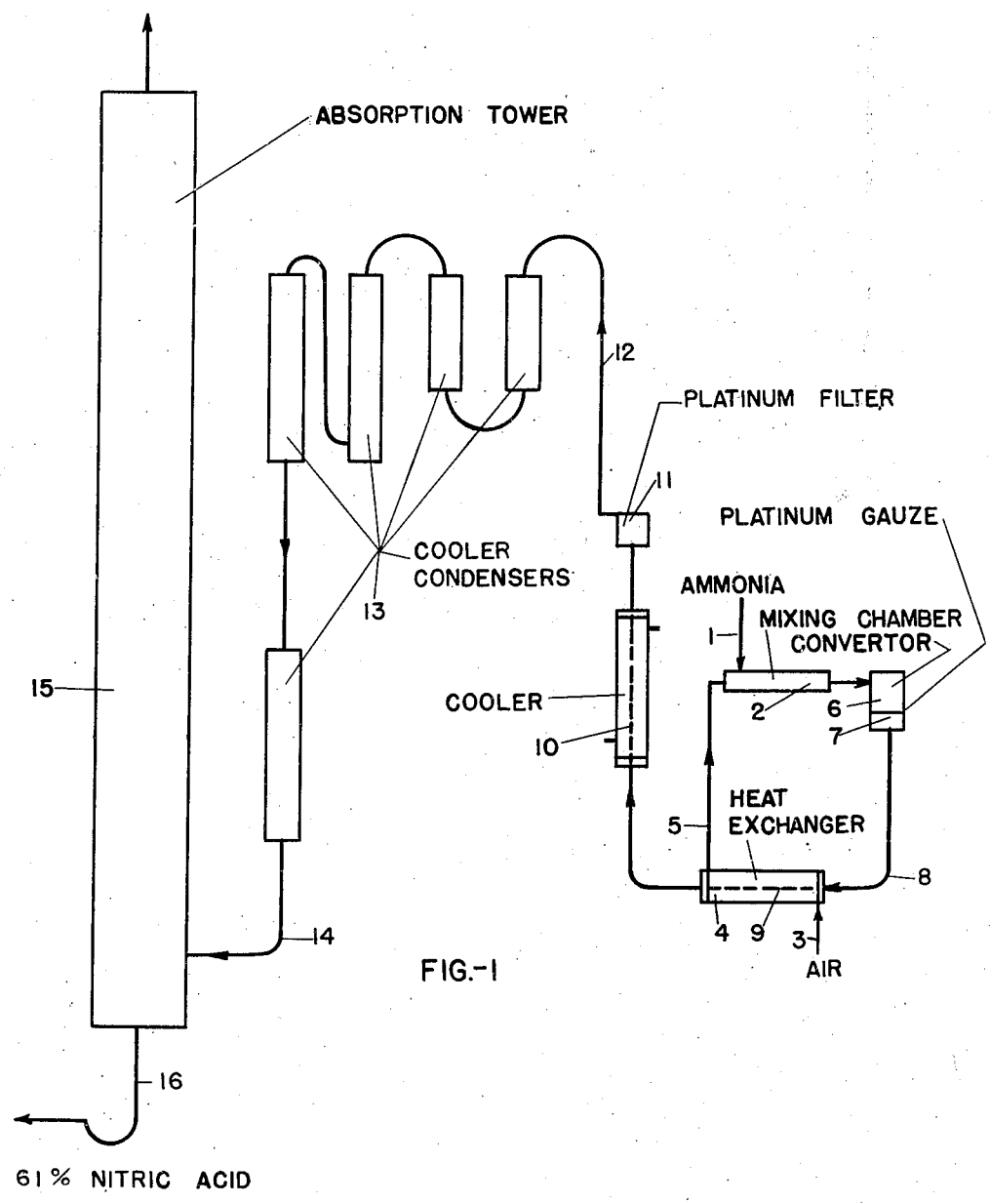

Dec. 24, 1940.     F. ZIMMERMANN     2,226,149
METHOD FOR REACTING GAS MIXTURES BY MEANS OF PRECIOUS METAL CATALYSTS
Filed Aug. 12, 1939     3 Sheets-Sheet 1

61% NITRIC ACID

FRITZ ZIMMERMANN
INVENTOR

ATTORNEY

Dec. 24, 1940.   F. ZIMMERMANN   2,226,149
METHOD FOR REACTING GAS MIXTURES BY MEANS OF PRECIOUS METAL CATALYSTS
Filed Aug. 12, 1939    3 Sheets-Sheet 2

SECTION "A"-"A"

FRITZ ZIMMERMANN
INVENTOR

ATTORNEY

Dec. 24, 1940.    F. ZIMMERMANN    2,226,149
METHOD FOR REACTING GAS MIXTURES BY MEANS OF PRECIOUS METAL CATALYSTS
Filed Aug. 12, 1939    3 Sheets-Sheet 3

FRITZ ZIMMERMANN
INVENTOR
ATTORNEY

Patented Dec. 24, 1940

2,226,149

UNITED STATES PATENT OFFICE 2,226,149

METHOD FOR REACTING GAS MIXTURES BY MEANS OF PRECIOUS METAL CATALYSTS

Fritz Zimmermann, Newark, N. J., assignor, by direct and mesne assignments, of one-half to Baker & Company, Inc., Newark, N. J., a corporation of New Jersey, and one-half to Hercules Powder Company, Wilmington, Del., a corporation of Delaware Application August 12, 1939, Serial No. 289,861

5 Claims. (Cl. 23—1)

This invention relates to a method of reacting gas mixtures by means of a precious metal catalyst, and more particularly to a method of recovering precious metals lost from such catalysts during such operations.

The oxidation of ammonia, for instance, involves the mixing of ammonia gas with oxygen or oxygen-containing gases, e. g., air, and the passage of such gas mixture through or over a catalyst maintained at an elevated temperature, whereby the ammonia is oxidized to oxides of nitrogen. The oxides of nitrogen are primarily used in the manufacture of nitric acid, by absorption of said oxides of nitrogen in water, but they are also used in the manufacture of sulfuric acid.

The catalyst is usually in the form of gauze, but may also consist of perforated plates, strips or other suitable structures. The catalyst metal of which the structure is formed comprises a precious metal, usually platinum, or an alloy thereof with another precious metal, usually a metal of the platinum group, e. g. an alloy of platinum and rhodium or of platinum and iridium, and may also contain non-precious metals or materials.

The catalysts are operated at elevated temperatures, such as 650° C. to 1000° C. and above, and suffer considerable metal losses during the operation, due to physical and chemical attack by the gases. The amount of catalyst metal thus lost increases with increasing temperature and increasing rate of production, and some catalysts suffer greater metal losses than others due to difference in ability to withstand the attack by the gases.

Such losses represent a substantial monetary loss, due to the high cost of the catalyst metal. For instance, processes of oxidizing ammonia to oxides of nitrogen involve operation at relatively high temperatures and at a relatively high rate of production and the metal losses therein encountered are often as high as and even higher than 2.2 troy ounces per 100,000 lbs. avoirdupois of ammonia burned.

I have found that a very substantial proportion of such catalyst losses otherwise going to waste may be simply and readily recovered by the use of a suitable filter in the gas lines beyond the reaction chamber, without introducing the expected complications of obstruction to gas flow or pressure due to obstruction in the pipes, even at the high temperatures encountered in such gas streams. I am able so to recover the catalyst otherwise lost, no matter whether the process be operated at atmospheric pressure or at a pressure above or below atmospheric pressure.

I find that my filter is surprisingly efficient in its recovery of the lost catalyst, when it is considered that the particles of the catalyst are carried in the gas stream in a very fine state of subdivision and are distributed throughout a very large volume of gas. While I do not confine myself to any particular theory of operation, I believe that the high efficiency of my filter may be due to the fact that the catalyst particles carried by the gas are electrostatically charged and adhere to the filter-bed because of this charge, rather than merely being mechanically retained. This theory of operation is believed to be supported by the fact that a majority of the catalyst particles are retained near the surface of the filter-bed with which the gas stream first comes into contact, with a smaller proportion retained by the deeper layers of the filter-bed.

The above theory may not be correct as it is possible that since the filter which I use is grounded to metal structure of the entire apparatus, the catalyst particles lose their electrical charges. Thus, the platinum or other precious metals lost from the catalyst mass and being in the form of colloidal metal or metal oxide may on contact with the filter discharge the assumed electrical charge and thereby cause a more perfect precipitation of the precious metal on the filter. I, therefore, do not wish to definitely state the mechanism of my invention, but only wish to point out the two most plausible theories of operation.

In the manufacture of nitric acid the filter is placed in the conduit leading from the oxidation chamber and prior to the point at which the water vapor condenses, as it has been found that the catalyst metal, e. g. platinum, which is contained in the gas stream in very finely divided form, part thereof probably in the form of an oxide thereof, will, at least partly, dissolve in the liquid acid which begins to form at the condensation temperature of the water vapor, and as the catalyst metal may otherwise become partly deposited in the pipes of for instance the cooler-condensers. It is desirable to place the filter as close as possible to the oxidation chamber, considering temperature and construction of the apparatus, in order to catch the catalyst metal before substantial quantities thereof have had an opportunity to become deposited in any pipes. If the filter is thus placed relatively close to the oxidation chamber, it is desirable to provide for at least one more filter, placed subsequent to the first filter, in order to catch any fine particles that may have passed through the first filter.

The filter itself is comprised of a highly permeable conglomerate metal structure or mass such, for example, as a filter of metal wool. The filter is preferably arranged in a chamber in such a way that no material pressure is interposed against the passage therethrough of the gases. This filter of a highly permeable, conglomerate metal structure or mass, I find, recovers a much higher percentage of the lost catalyst than does the filter described in the copending application, Chastain Serial No. 226,886, filed August 26, 1938.

I have found extremely useful particularly such metals as stainless steel, nickel steel, chrome steel, aluminum, Monel and nickel. If filter materials capable of withstanding high temperatures 650° C. and more, and capable of withstanding the corrosive action of the gases in the system such as wool of high melting and corrosion resistant metals, for example, stainless steel, nickel steel, chrome steel, Monel and nickel, and the like are used, it is possible to place the filter below the catalyst and actually inside or at the exit of the converter.

While I may use a veriety of different highly permeable conglomerate metal or alloy structures as a filter in my process, I have found that metal and alloy wools are particularly suited to the purpose since they have less tendency to obstruct the flow of the gas stream than material in coarser or more compact forms. I have found that metal or alloy wool, size 000 is entirely satisfactory for this purpose. Where in this specification I have used the term metal, it is to be understood that I mean either metals or alloys thereof.

Figure 2:
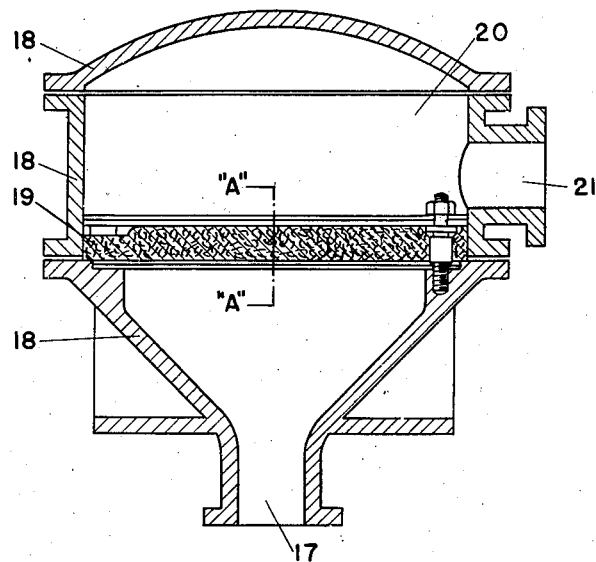
Figure 3:
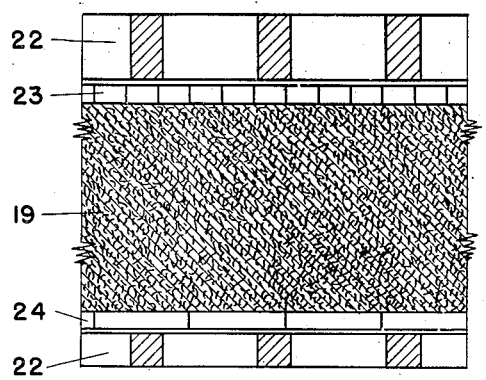
Figure 4:
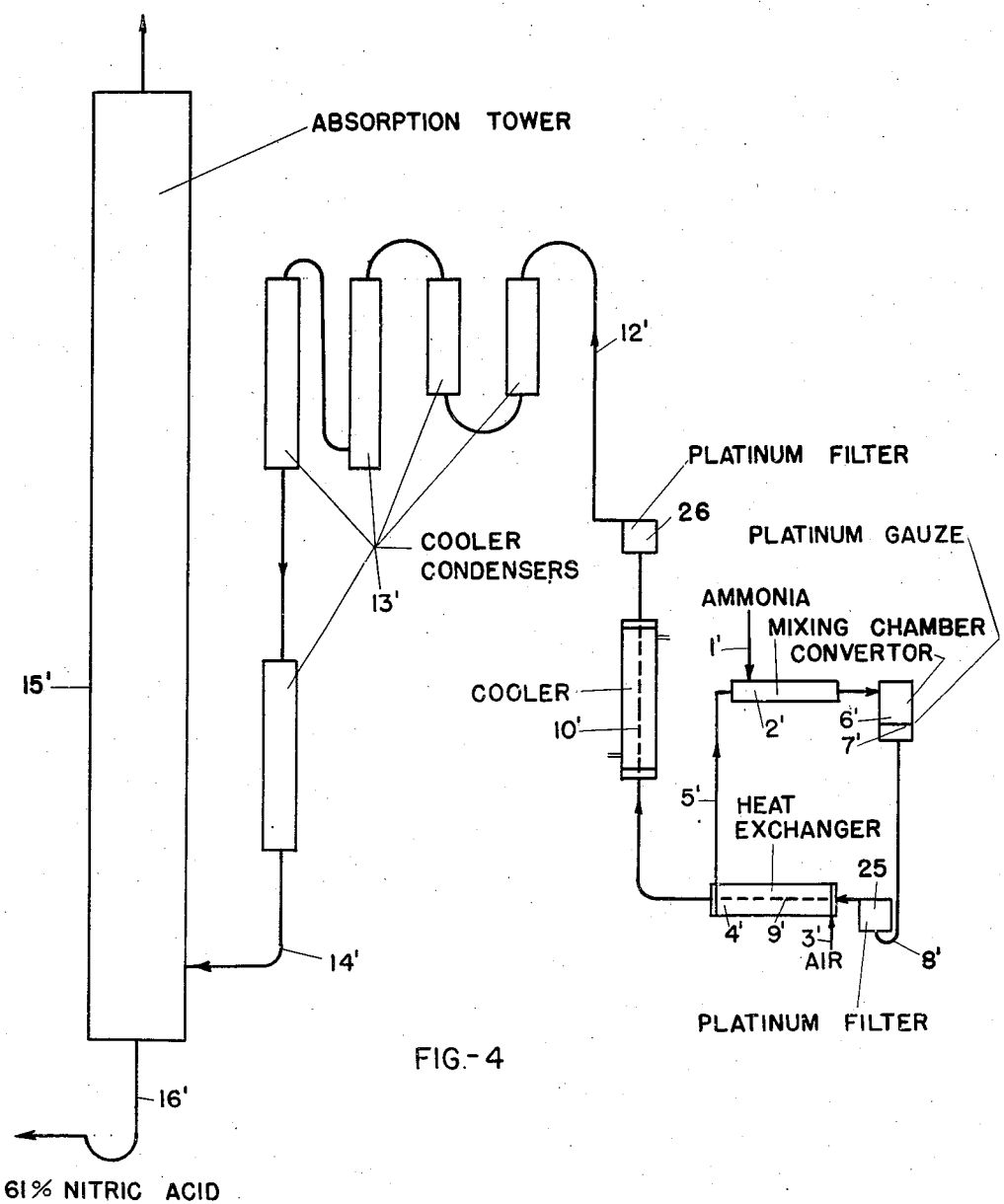

As specific illustrations of two alternate embodiments of my invention, reference is made to the accompanying drawings, in which Figure 1 represents a flow sheet of a process of manufacture of nitric acid utilizing one embodiment of my invention, and Figure 2 represents a section of a specific embodiment of a filtering device adapted for use in accordance with my invention, and Figure 3, a section of the device of Figure 2 along the lines A—A', and Figure 4 represents a flow sheet of a process of manufacture of nitric acid utilizing an alternate embodiment of my invention.

Referring now specifically to Figure 1 of the accompanying drawings, I represents a conduit, through which is passed ammonia gas, to mixing chamber 2, where it is mixed with air entering via conduit 3, heated by heat exchange 4, and passing via pipe 5 to said mixing chamber 2. From mixing chamber 2 the thoroughly mixed gas, consisting of ammonia and air, passes directly to oxidation chamber 6, where it passes through the hot catalyst 7 maintained at a high heat by the exothermic reaction. The gases, after passing the catalyst, consist mainly of water in the form of vapor, nitrogen and oxides of nitrogen, and pass via conduit 8 through heat interchanger 9 and conduit 10, to filter 11, preferably adapted to withstand relatively high heat (about 300° C.) and not materially obstruct gas flow, as herein set forth, then via conduit 12 to cooler-condensers 13, in series, where a substantial proportion of the water is condensed, then via conduit 14 to absorption tower 15, where the nitric oxide gases are converted into a nitric acid of about 61% concentration, which runs via conduit 16 to suitable storage tanks (not shown).

Referring now specifically to Figure 2 of the accompanying drawings, the entire device represents the filter shown as 11 in Figure 1. The gases coming from the oxidation chamber enter the filter via opening 17 and pass into the housing 18, which may be constructed of aluminum, stainless steel, or other metal resistant to corrosive gases, then pass through filter-bed 19, composed of metal or alloy wool, where the very fine particles of catalyst carried by the gas stream are caught and retained, the filtered gases then passing into chamber 20 and to outlet 21, where they meet conduit 12 of Figure 1 and pass on to the rest of the process.

Referring now specifically to Figure 3 of the accompanying drawings, which represents a section of the filter of Figure 2, along the line A—A, 19 represents the filter-bed, 22 a perforated plate of Monel metal, or other metal resistant to nitric acid, 23 a wire screen of like metal, 24 a metal plate of like metal and having somewhat larger openings than plate 23.

It will be noted that the filtering device of Figure 2 is contained in a housing comprising several parts, bolted or clamped together (not shown), in a manner such that the whole can be readily disassembled for removing and replacing the filter-bed.

It will be further noted that the filtering device of Figure 2 provides a filter-bed 19 having a surface area several times the cross-sectional area of the entering conduit 17 or of the exit conduit 21. By utilizing such a larger area for my filter-bed, I minimize the retardation of the flow of gases through the device.

Tests with the apparatus shown in Figure 1 in which the filter consisted of steel wool showed a high recovery of about 50% of catalytic metal loss.

From the above it is clear that the metal wool is an efficient filter and provides means of effecting a substantial catalyst recovery.

Referring now specifically to Figure 4 of the accompanying drawings, which represents a flow sheet of a process of manufacture of nitric acid in which two filters are used in series, 1' represents a conduit, through which is passed ammonia gas to mixing chamber 2' where it is mixed with air entering via conduit 3', heated by heat exchanger 4', and passing via pipe 5' to said mixing chamber 2'. From mixing chamber 2' the thoroughly mixed gas, consisting of ammonia and air, passes directly to oxidation chamber 6', where it passes through the hot catalyst 7' maintained at a high heat by the exothermic reaction. The gases, after passing the catalyst, consist mainly of water in the form of vapor, nitrogen and oxides of nitrogen, and pass via conduit 8' to filter 25, adapted to withstand high temperature (about 700° C.) and not materially obstruct the gas flow. This filter 25 may be constructed, for example, as shown in Figures 2 and 3. From the filter 25 the gases pass through heat interchanger 9' and conduit 10' to a second filter 26, preferably adapted to withstand relatively high temperature (about 300° C.) and not materially obstruct gas flow, as hereinbefore set forth, then via conduit 12' to cooler-condensers 13', in series then via conduit 14' to absorption tower 15' where the nitric oxide gases are converted in nitric acid of about 61% concentration, which runs via conduit 16' to suitable storage tanks (not shown).

When the filter has been in operation for a considerable time, the exact length of time depending on the quantity of gas converted, the condition of the catalyst, the temperature of the catalyst and the rate of production, it is removed, the filter-bed removed and replaced with a fresh filter-bed, and operations resumed. This use of two filters in series effects a higher recover of the catalyst particles in the gas stream.

It is also possible of course to have a second filter arranged in parallel to the first filter through which the gas stream can be diverted when the first filter requires removal; in this way no interruptions whatever in the oxidation operation take place.

The removed filter-bed is then subjected to suitable treatment to recover the precious metal content thereof. In general, the recovery will comprise the solution of the metal or alloy wool in a suitable solvent which is not a solvent for the precious metal and separation of the precious metal therefrom. I have found that most of the metal or alloy wool may be dissolved in hydrochloric acid and the precious metal content filtered out of the resulting solution. If the metal or alloy which is used as the filter must be dissolved in solvents which are sufficiently strong to also dissolve the catalyst, I have found that after solution I may recover the catalyst by selective precipitation of either the filter substance or of the catalyst. Further methods of recovery which may be used are the standard smelting and refining processes used in the precious metal art, but I prefer to use the solution method as it is more economical.

By the practice of my process I am enabled to recover high percentages, such as, for example about 50% and above, of the precious metal lost by the catalyst during the operation as described. Since many ounces thereof are lost annually from the catalyst in the normal operation of converting very large quantities of gases, e. g. ammonia, the recovery of a considerable part of such loss represents a very substantial saving in the operations.

While I have described my invention in particular reference to the oxidation of ammonia to oxides of nitrogen and to the oxidation of ammonia to nitric acid, it is evident that my invention also applies to the recovery of precious metals lost from precious metal catalyst used in the reacting of other gas mixtures and the conversion of gases other than ammonia provided the precious metal catalyst is operated at elevated temperatures. One such other reaction process is for instance the reaction at a high temperature in the presence of a catalyst of the type hereinbefore described of a mixture containing ammonia, hydrocarbons, e. g. methane, and oxygen, to produce hydrogen cyanide or hydrocyanic acid.

Also I do not restrict my invention to the particular construction shown, but, as is evident, I may use any suitable shape or form of apparatus suitable for filtrations of hot, corrosive gases, which does not materially obstruct the flow of said gases.

The term "catalyst particles" as used hereafter refers to the catalyst lost as hereinbefore described.

What I claim and desire to protect by Letters Patent is:

1. A method of recovering precious metal lost during a gaseous reaction in the presence of a precious metal catalyst, which includes passing the gases through a self-supporting, precious metal, catalytic mass, and then passing the reacted and unreacted gases through a porous filter constructed of a highly permeable, conglomerate metal mass, said filter positioned at a point where the temperature is maintained above the condensation temperature of any material in the gas stream, which is condensable to liquid at normal temperatures and pressures, and recovering the catalyst particles retained within said porous filter.

2. A method of recovering precious metal lost during a gaseous reaction in the presence of a precious metal catalyst, which includes passing the gases through a self-supporting, precious metal, catalytic mass, and then passing the reacted and unreacted gases through a porous filter constructed of metal fiber, said filter positioned at a point where the temperature is maintained above the condensation temperature of any material in the gas stream, which is condensable to liquid at normal temperatures and pressures, and recovering the catalyst particles retained within said porous filter.

3. A method of recovering precious metal lost during a gaseous reaction in the presence of a precious metal catalyst, which includes passing the gases through a self-supporting, precious metal, catalytic mass, and then passing the reacted and unreacted gases through a porous filter constructed of steel wool, said filter positioned at a point where the temperature is maintained above the condensation temperature of any material in the gas stream, which is condensable to liquid at normal temperatures and pressures, and recovering the catalyst particles retained within said porous filter.

4. A method of recovering precious metal lost during a gaseous reaction in the presence of a precious metal catalyst, which includes passing the gases through a self-supporting, precious metal, catalytic mass, and then passing the reacted and unreacted gases through a porous filter constructed of aluminum wool, said filter positioned at a point where the temperature is maintained above the condensation temperature of any material in the gas stream, which is condensable to liquid at normal temperatures and pressures, and recovering the catalyst particles retained within said porous filter.

5. A method of recovering precious metal lost during a gaseous reaction in the presence of a precious metal catalyst, which includes passing the gases through a self-supporting, precious metal, catalytic mass, and then passing the reacted and unreacted gases through a porous filter constructed of alloy steel wool, said filter positioned at a point where the temperature is maintained above the condensation temperature of any material in the gas stream, which is condensable to liquid at normal temperatures and pressures, and recovering the catalyst particles retained within said porous filter.

FRITZ ZIMMERMANN.